UNITED STATES PATENT OFFICE.

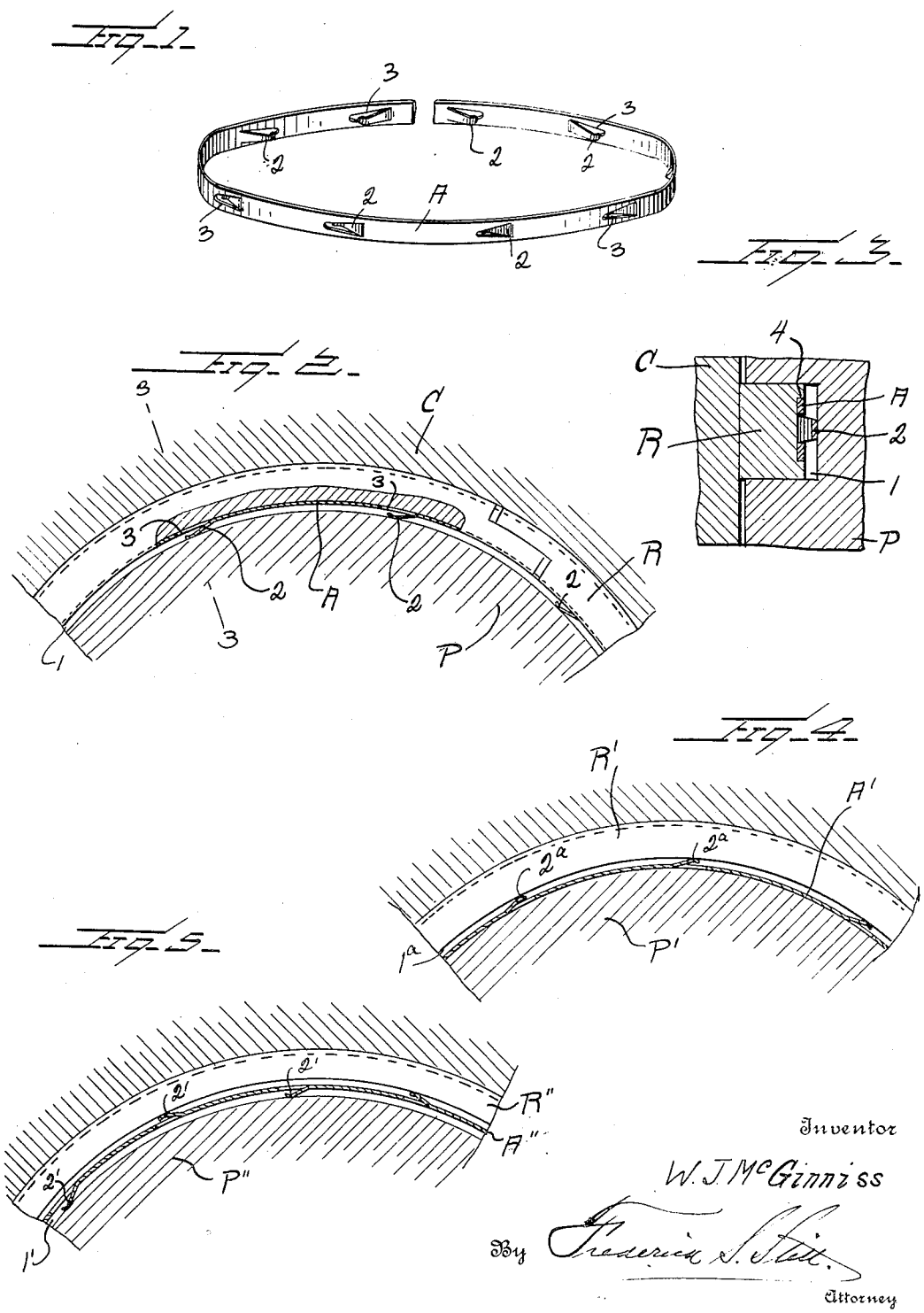

WILLIAM J. McGINNISS, OF WASHINGTON, DISTRICT OF COLUMBIA.

EXPANDER FOR PISTON-RINGS.

1,348,953.  Specification of Letters Patent.  Patented Aug. 10, 1920.

Application filed June 21, 1919. Serial No. 305,746.

*To all whom it may concern:*

Be it known that I, WILLIAM J. McGINNISS, a citizen of the United States, residing at Washington, in the District of Columbia, have invented certain new and useful Improvements in Expanders for Piston-Rings, of which the following is a specification.

This invention relates to packing for pistons and is an improvement on the structure disclosed in my prior Patent #1,288,085, dated December 17, 1918, and it is an object of the invention to provide an expander for a piston ring adapted to be arranged inwardly of the main piston ring and of a novel and improved construction whereby the main piston ring is constantly urged outwardly relative to the piston so that the main ring will have the requisite contact with the internal wall of the cylinder during all periods of the operation of the piston and thereby effect a more perfect seal of the cylinder chamber for preventing the wastage of gasolene or other liquid used for fuel or lubrication and thus giving a maximum of power and enabling the piston to perform its function with greater efficiency.

It is also an object of the invention to provide an expander for coaction with the main piston ring whereby the main piston ring is provided with all of the advantages offered by the type of ring as embodied in my prior patent hereinbefore referred to and wherein the expander is of steel or other material harder than the main ring and possessing the requisite inherent resiliency.

The invention consists in the details of construction and in the combination and arrangement of the several parts of my improved expander whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in perspective of an expander constructed in accordance with an embodiment of my invention.

Fig. 2 is a fragmentary view partly in section and partly in elevation and of a somewhat diagrammatic character illustrating an expander as disclosed in Fig. 1 in applied position.

Fig. 3 is an enlarged fragmentary sectional view taken substantially on the line 3—3 of Fig. 2.

Fig. 4 is a view somewhat similar to Fig. 2 but illustrating an expander arranged in accordance with a further embodiment of my invention, and Fig. 5 is a view somewhat similar to Fig. 2 but illustrating a still further embodiment of my invention.

As particularly illustrated in Figs. 1 to 3 inclusive, P denotes a piston mounted for rectilineal movement within a cylinder C and 1 denotes an annular channel disposed around the piston P and in which is adapted to be seated a piston ring R of any one of the types in general use although I do not wish to be understood as limiting myself in any way as to the type of ring.

My improved expander or supplemental ring A is formed of steel or other material possessing inherent resiliency and of a greater hardness than the ring R. The ring A is split and of fixed formation and is adapted to be interposed between the inner face or wall of the ring R and the base of the channel 1. As is particularly illustrated in Fig. 2 the ring A is substantially constantly in contact with the inner wall or face of the ring R at all points and struck from the ring A at substantially equi-distantly spaced points are the tongues 2. The tongues 2 are substantially V shape in form with their apices outwardly disposed and extending in a direction circumferentially of the ring A. The free or apex portion of each of the tongues 2 is slightly rounded, as at 3, so that the same will have substantially ruling contact with the base of the channel 1.

The tongues 2 possess inherent resiliency and when the piston P is assembled within the cylinder C the necessary contraction of the ring R places the tongues 2 under tension so that said tongues 2 serve, independently of the natural resiliency or expansion of the ring R, to constantly urge the ring R outwardly relative to the piston P so that the ring R will have the requisite contact with the internal wall of the cylinder C during all periods of the operation of the piston and thereby effecting a more perfect seal for the cylinder chamber for preventing the wastage of gasolene, kerosene, or other liquid used for the purpose of explosion or lubrication and thus giving a maximum of power and enabling the piston to perform its function with greater efficiency. With the use of my improved expander or supplemental ring A the piston P is stabilized within the cylinder as an effective compensation is made for the action of the piston within the cylinder as the result of the force of the explosion to one side of the axial center of the piston and furthermore the expander or supplemental ring A affords additional means for constantly urging the ring R outwardly so that the expansion of the ring R does not depend wholly upon the inherent resiliency or expansion possessed by the ring R.

By having the ring A substantially in constant contact with the inner wall or face of the ring R, creeping of said ring A is effectively prevented. Although not essential, it is of advantage to have the ring A snugly seat within a groove 4 produced in the inner wall or face of the ring R and extending circumferentially thereon.

In the embodiment of my invention as particularly illustrated in Figs. 1 to 3 the tongues 2 extend inwardly of the ring A but in the embodiment of my invention as illustrated in Fig. 1 the tongues 2$^a$ extend outwardly from the ring A' and have their free extremities in contact with the inner face or wall of the ring R' while the ring A' is substantially in constant contact with the base of the channel 1$^a$ in the piston P'.

In the embodiment of my invention illustrated in Fig. 5 the tongues 2' of the expander or supplemental ring A'' are alternately extended in opposite directions whereby the tongues 2' have contact with the inner face or wall of the ring R'' and the base of the channel 1' of the piston P''.

From the foregoing description, it is thought to be obvious that an expander for a piston ring constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. As a new article of manufacture, an expander for a piston ring comprising a ring adapted to be interposed between a main piston ring and a piston, said ring being formed with integral resilient tongues projecting from a face thereof.

2. As a new article of manufacture, an expander for a piston ring comprising a ring adapted to be interposed between a main piston ring and a piston, said ring being formed with laterally projecting and integral tongues, and with openings registering with said tongues, the openings being of a size capable of receiving said tongues flush with the remaining portions of said ring.

3. As a new article of manufacture, an expander for a piston ring comprising a ring adapted to be interposed between a main piston ring and a piston, said ring being formed with laterally projecting tongues integrally connected together at one end and free at their other ends, and with openings registering with said tongues and of a size capable of receiving said tongues flush with the remaining portions of said ring.

4. As a new article of manufacture, an expander for a piston ring comprising a ring adapted to be interposed between a main piston ring and a piston, said ring being formed with laterally projecting and circumferentially extended integral tongues and with openings registering with said tongues and of a size capable of receiving said tongues flush with the remaining portions of said ring, said tongues being spaced from each other in a circumferential direction.

In testimony whereof I affix my signature.

WILLIAM J. McGINNISS.